United States Patent [19]

Pace

[11] Patent Number: 4,640,477

[45] Date of Patent: Feb. 3, 1987

[54] CLOSING DEVICE FOR AN AIRFOIL

[75] Inventor: James W. Pace, Mercer Island, Wash.

[73] Assignee: The Boeing Company, Seattle, Wash.

[21] Appl. No.: 687,929

[22] Filed: Dec. 31, 1984

[51] Int. Cl.[4] ............................ B64C 3/50; B64C 1/38
[52] U.S. Cl. .................................... 244/214; 244/215; 244/130
[58] Field of Search ............... 244/210, 211, 213, 214, 244/215, 216, 219, 130; 89/37.19, 37.21, 1.817

[56] References Cited

U.S. PATENT DOCUMENTS

| | | | |
|---|---|---|---|
| 2,381,679 | 8/1945 | Maxwell | 244/211 |
| 2,381,680 | 8/1945 | Maxwell | 244/211 |
| 3,968,946 | 7/1976 | Cole | 244/214 |
| 4,042,191 | 8/1977 | Johnson | 244/214 |
| 4,189,121 | 2/1980 | Harper et al. | 244/214 |
| 4,360,176 | 11/1982 | Brown | 244/214 |

FOREIGN PATENT DOCUMENTS 1011175 6/1952 France .

Primary Examiner—Galen L. Barefoot
Assistant Examiner—Lynn M. Fiorito
Attorney, Agent, or Firm—Hughes & Cassidy

[57] ABSTRACT

An improvement to close an opening formed in the leading edge of an airfoil when a slat is moved to its deployed position. The track which deploys the slat has a downward component of motion which leaves an opening in the wing leading edge that can cause premature stall in the opening is not closed. To close this opening, there is a door which is mounted about an axis of rotation that is positioned in a vertical plane generally parallel to the movement of the track. Further, the axis of rotation is slanted so that the door moves upwardly, rearwardly and laterally to its retracted position so as to permit the track to be retracted, and when the track is extended, a spring moves the door into its deployed position to close the opening.

18 Claims, 6 Drawing Figures

CLOSING DEVICE FOR AN AIRFOIL

BACKGROUND OF THE INVENTION

1. Field of the Invention

The present invention relates to a device to close an opening in an airfoil, and more particularly a device to close an opening in an airfoil leading edge which results from deploying a leading edge flap or slat.

2. Background Art

Aircraft wings are commonly designed with leading edge flaps or slats which have a retracted position for cruise, and a downwardly and forwardly extended position for high lift operation, such as in takeoff and landing. In the cruise configuration, the flaps or slats generally conceal the main or fixed leading edge structure of the airfoil, but in the deployed position, the surface of this leading edge structure of the airfoil is exposed to airflow, in circumstances where, for example, the flap or slat forms with the main leading edge structure a slot for flow of air therethrough. Generally, there is some type of connecting member extending between the flap and the wing structure, such as a track which supports the flap, or a servicing member such as a telescopic thermal anti-icing duct. In some circumstances, it is necessary for these interconnecting members to penetrate (i.e. extend) through the skin forming the leading edge surface of the main airfoil structure. It sometimes happens that in the movement of the flap or slat from the retracted to the deployed position, these interconnecting members move relative to the leading edge opening in the main wing structure so that the opening in the skin of the leading edge structure must be made larger than the connecting members themselves. Such open areas at and above the leading edge must be closed off to prevent the unfavorable effects that such openings so located have on an airfoil, particularly the effect of increasing the stall speed caused by the flow disturbance resulting from the openings.

The conventional apparatus for closing off the undesired opened areas have been in the form of various types of sliding and curtain seals. These have not been totally satisfactory with regard to such things as, for example, durability. Another problem in providing such a closure device for these leading edge openings is that sometimes the open space available inside the main leading edge structure is rather limited, because of the presence of structural components or other apparatus.

A search of the patent literature has revealed a number of patents relating to closing various openings or gaps in aerodynamic structure. These are noted below.

U.S. Pat. No. 2,381,680, Maxwell, shows a leading edge device for an airfoil where the leading edge device can be moved to a deployed position to form a slot. The leading edge device itself is provided with a slot cover which closes the slot when the leading edge device is retracted for cruise configuration. U.S. Pat. No. 2,381,679, also issued to Maxwell, shows a similar arrangement.

U.S. Pat. No. 3,968,946, Cole, shows an extendable aerodynamic fairing. In this arrangement, there is a leading edge flap which is rotated outwardly to a deployed position. A gap is formed between the inboard end of the leading edge flap and the adjacent structure. Accordingly, there is an extendable fairing which rotates outwardly from the adjacent structure to close this gap.

U.S. Pat. No. 4,042,191, Johnson, illustrates a flexible seal that closes a gap which exists between a Krueger-type flap and the leading edge surface of the main wing structure. The pressure differential caused by the air flowing over the upper wing surface moves the seal into its closed position.

French Pat. No. 1,011,175 illustrates what appears to be a member which rotates about an axis generally parallel to a spanwise axis of an airfoil to close a gap in a surface forming a leading edge slot.

SUMMARY OF THE INVENTION

The present invention is adapted to be used in an airfoil where there is a leading edge structure having a front skin section and a leading edge device having a cruise position covering the front skin section, and a deployed position where the front skin section is exposed to airflow. The airfoil has a spanwise axis, a chordwise axis and a vertical axis. The airfoil has a connecting member extending between the leading edge structure and the slat.

The front skin section has a front opening through which the connecting member extends. The airfoil is characterized in that during movement of the leading edge device to its deployed position, the connecting member has a component of motion in the opening generally transverse to the chordwise axis to a transversely displaced position, so as to leave a portion of the opening as an exposed front skin area.

The improvement of the present invention is adapted to close this exposed front skin open area when the connecting member is in its displaced position. The improvement comprises a door having a surface configuration generally matching the exposed front skin area.

Further, the improvement comprises a pivot mounting device by which the door is pivotally mounted in the leading edge structure for movement about an axis of rotation having a substantial alignment component generally perpendicular to a portion of the front skin section adjacent to the exposed front skin area. Further, the axis of rotation has substantial alignment components parallel to a plane of movement through which the connecting member moves from its first position to its second position.

The mounting device is characterized in that the door has a first retracted position where the door is removed from the exposed front surface open area and displaced about said axis of rotation from a position occupied by the connecting member in its retracted position. The door has a second deployed position where the door is positioned in the plane of movement and closes at least a portion of the exposed front surface open area. There is means to cause the door to move between its retracted and deployed positions. In the preferred form, the movement of the door to its deployed position is caused by spring means operatively connected to the door. Further, in the preferred form, the door is provided with a contact portion, and the connecting member in moving from its deployed to its retracted position engages the contact portion to move the door to its retracted position.

Further, in the particular embodiment shown herein, the connecting member is characterized in that in moving between its retracted to its deployed position, the connecting member moves forwardly and also downwardly, so as to leave the exposed front surface open area above the connecting member in its deployed position. Also, the front skin section has at the location of the opening, an upward and rearward slant, and the axis of rotation is oriented so that the door moves in an upward and rearward direction adjacent the skin section.

In the method of the present invention, apparatus is provided as disclosed above. The door is moved to its deployed position by the spring means as described above. Further, the movement of the connecting member from its deployed to its retracted position causes engagement of the door with the connecting member to move the door to its retracted position.

Other more specific features of the present invention will become apparent from the following detailed description.

DESCRIPTION OF THE PREFERRED EMBODIMENT

It is believed a better understanding of the present invention will be obtained by first describing the overall configuration of the forward portion of a typical wing 10 for which the present invention is particularly adapted. After such a description, the door assembly of the present invention will be described.

Figure 1:
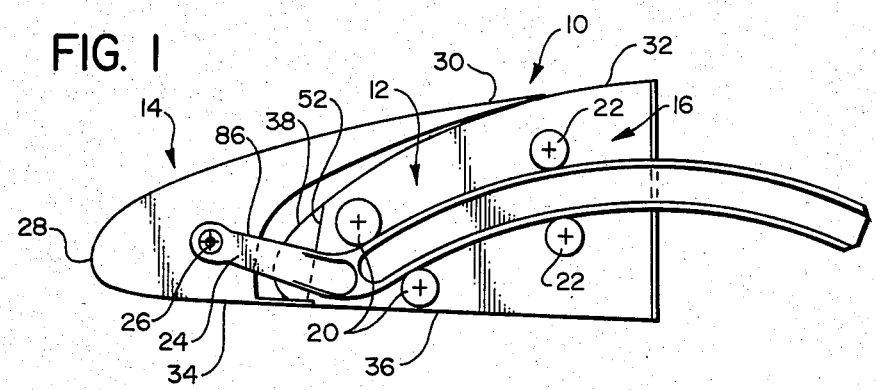
FIG. 1 is a sectional view of a forward portion of an airfoil, taken along a vertical plane coinciding with a chordwise axis of the airfoil.

In FIG. 1, there is shown a somewhat simplified drawing of a leading edge portion of a wing 10 of an aircraft. This wing 10 comprises a leading edge structure 12 (which is part of the main wing structure) and a leading edge slat 14, mounted to the leading edge structure 12 by means of a track assembly 16. This track assembly 16 comprises a main track 18 mounted in forward and rear sets of rollers 20 and 22, respectively, which are in turn mounted in the leading edge structure 12. The forward end 24 of the track 18 is connected at 26 to the leading edge slat 14.

Figure 2:
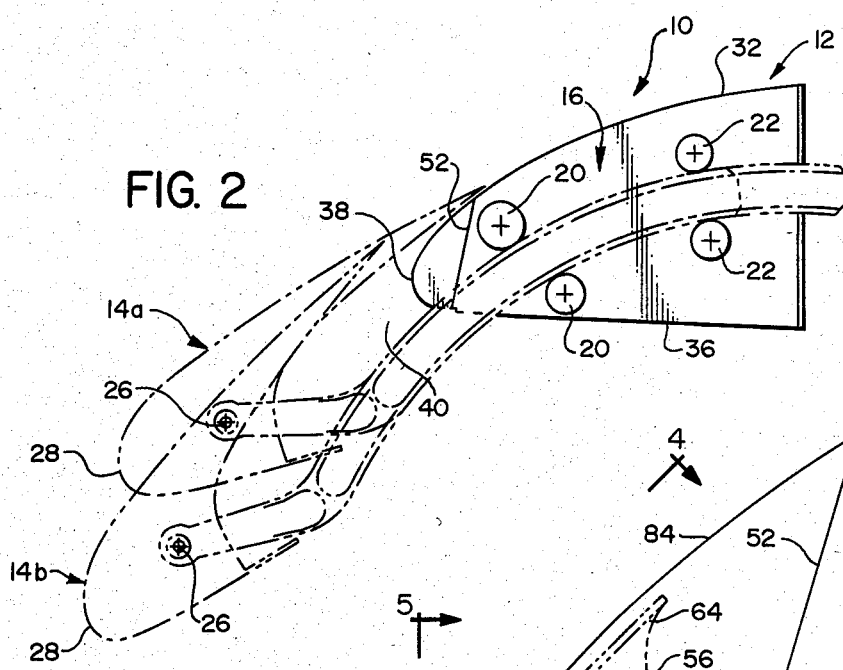
FIG. 2 is a view similar to FIG. 1, but showing the leading edge slat of the airfoil in two deployed positions.

In FIG. 1, the slat 14 is shown in its retracted position for the cruise configuration of the wing 10. In the position of FIG. 1, the leading edge 28 of the slat 14 forms the leading edge of the entire wing 10, and the upper rear portion 30 of the slat 14 extends rearwardly in a moderate upward slant to blend aerodynamically with the upper surface 32 of the wing 10. In like manner, the lower rear portion 34 of the slat 14 blends aerodynamically with the lower surface 36 of the wing 10. In FIG. 2, the slat 14 is shown in two different positions, namely a takeoff position, where the slat is shown in broken lines and designated 14a and a landing configuration where the wing is shown in broken lines and indicated at 14b. In both of the positions indicated at 14a and 14b, the slat 14 forms with the surface of the forward skin portion 38 of the leading edge structure 12 a slot 40 through which air flows from beneath the slat 14 upwardly and then over the upper surface 30 of the wing 10.

To deploy the slat 14 to the appropriate locations for optimum aerodynamic performance, the track 18 is formed in a moderate curve. Further, the forward end 24 of the track 18 extends moderately upwardly from the forward portion of the main curved portion of the track 18. With this particular arrangement, as the track 18 moves from the position of FIG. 1 to the positions of FIG. 2, the motion of the track is such that the track 18 has not only a forward but a downward component of motion in a vertical plane generally parallel to the chordwise axis of the wing 10.

Figure 4:
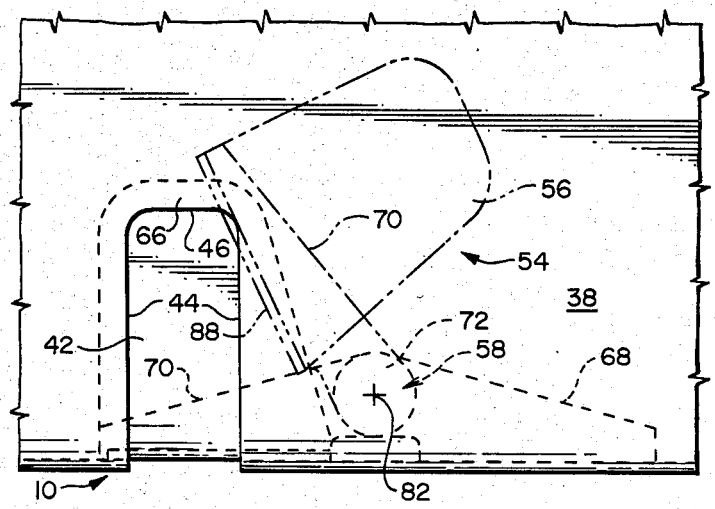
FIG. 4 is a view looking downwardly and rearwardly toward the door assembly of the present invention, taken along line 4—4 of FIG. 3.
Figure 5:
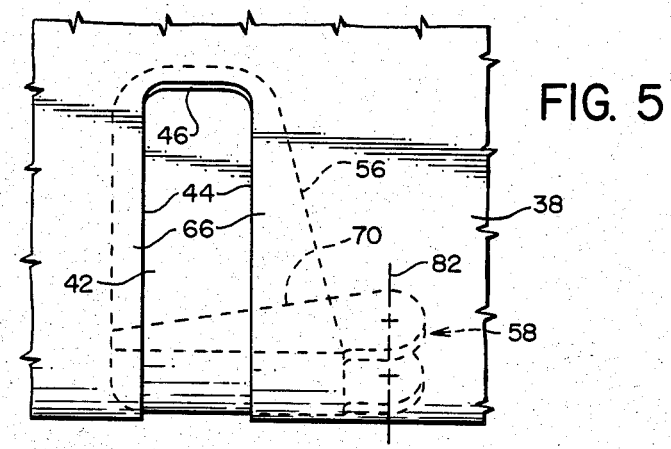
FIG. 5 is a front elevational view, taken along line 5—5 of FIG. 3, and looking in a rearward direction toward the door assembly of the present invention with only a portion of the door assembly being shown for ease of illustration.

For the track 18 to connect to the slat 14, it is necessary that the track 18 penetrate the forward skin portion 38 of the leading edge structure 12, thus necessitating the formation of a front opening 42 in the forward skin portion 38. (For ease of illustration, the opening 42 is not shown in FIGS. 1 and 2.) Because of the configuration and path of travel of the track 18, it is necessary that the opening 42 have a vertical and lower rear dimension greater than the height dimension of the track 18. Thus, as can be seen more clearly with reference to FIGS. 4, 5 and 6, the opening 42 has side edge portions 44 which are made moderately larger than the thickness dimension of the track 18 to provide adequate clearance. There is an upper forward edge portion 46 defining the upper limit or boundary of the opening 42, and a lower rear edge portion 48 defining the lower and rear limit of the opening 42. For purposes of description, the opening 42 can be considered as having a forward opening portion 42a which curves from a lower location upwardly past the forwardmost portion of the forward skin portion 38 and upwardly therefrom a short distance in the upwardly and rearwardly curved portion of the skin portion 38. The lower rear opening portion 42b extends essentially horizontally rearwardly.

When the slat 14 is in the stowed position of FIG. 1, the existance of the opening 42 is of little consequence, since it is concealed aerodynamically by the slat 14. However, when the slat 14 moves forwardly and downwardly to the deployed positions of 14a or 14b, as shown in FIG. 2, the movement of the track 18 is such that the forward upper opening portion 42a becomes exposed to the airflow through the slot 40. If the opening portion 42a remains uncovered, this can disturb the air flowing upwardly through the slot 40 and have the undesirable effect of increasing the stall speed of the wing 10.

Another factor which complicates the closing of the opening 42 is that the internal volume or spaced within and adjacent to the forward skin portion 38 is rather limited. In the particular arrangement illustrated herein, there is front spar 50 that extends in a spanwise direction along the forward part of the leading edge structure 12, just a short distance rearwardly of the most forward location of the forward skin section 38. The location of the vertical web 52 of the spar 50 is illustrated by a straight line in FIGS. 1 and 2.

To describe now the door assembly of the present invention, this door assembly 54 is particularly adapted to close the forward opening portion 42a in a particularly convenient and effective manner so as to be compatible with the configuration and operating characteristics of the components described above. This door assembly 54 comprises a door member 56 and a mounting device 58 by which the door member 56 is mounted for rotation from a first retracted position (illustrated at 56a in FIG. 6) to a second deployed position (illustrated at 56b in FIG. 6). The door member 56 is curved to match the general configuration of the forward skin portion 38. Thus, the door member 56 comprises a middle forward portion 60, a downwardly and rearwardly curving lower portion 62, and an upwardly and rearwardly curving upper portion 64. The perimeter portion of the door member 56 extends moderately beyond the edge openings 46 and 44 so as to fit against a perimeter portion 66 of the skin section 38, which perimeter portion 66 defines the opening portion 42a.

The mounting device 58 is essentially a spring loaded hinge assembly comprising a first arm 68 fixedly attached to the inner surface of the skin portion 38, and a second swing arm 70 fixedly attached to the inner surface of the lower portion 62 of the door member 56. The hinge connection of the arms 68 and 70 is or may be conventional and is designated 72. A spring member 74 has a middle coil portion 76 wrapped around the hinge portion 72, and two spring arms 78 and 80 reacting against the arms 68 and 70, respectively. The action of the spring member 74 is such that it urges the swing arm 70 and the door member 56 downwardly and forwardly to the deployed position at 56b where the door member 56 closes the front opening portion 42a.

The door assembly 54 is particularly arranged to function in the rather limited space which exists between the skin portion 38 and the web 52 of the front spar 50. To achieve this, the axis of rotation 82 provided by the hinge mechanism 72 is arranged so that it extends upwardly and forwardly, so as to be generally positioned in (i.e. have substantial alignment components parallel to) a vertical plane which is generally parallel to a vertical plane through which the main track 18 moves between its retracted and deployed positions. Further, this axis of rotation 82 is spaced laterally in a spanwise direction from the plane of motion within which the main track 18 moves. Also, this axis of rotation 82 has a substantial component of alignment that is generally perpendicular to a plane occupied by an upper portion 84 of the forward skin section 38, the portion 84 being that part of the skin section 38 which the door 56 moves adjacent to and generally parallel with, in moving from its deployed position 56b to its retracted position 56a.

Figure 3:
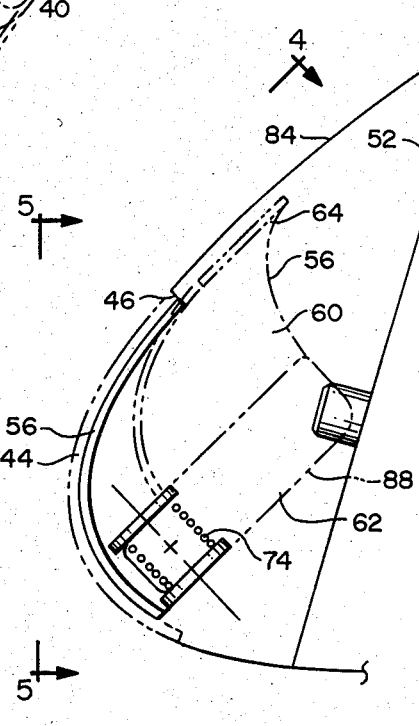
FIG. 3 is a sectional view, drawn to an enlarged scale, illustrating a door assembly of the present invention, which door assembly is adapted to close an opening in the skin of the forward main structure portion of the airfoil.
Figure 6:
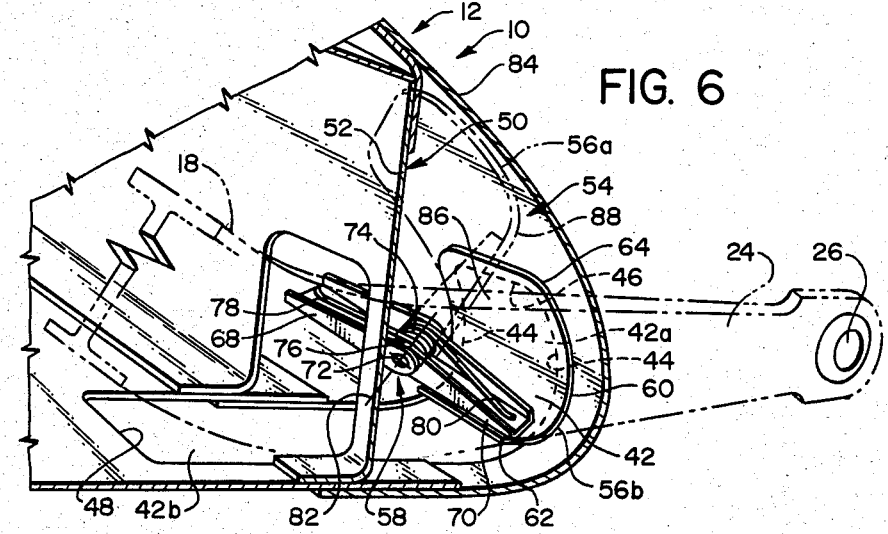
FIG. 6 is an isometric view illustrating the door assembly of the present invention and also illustrating a main track for the leading edge flap positioned in the opening that is closed by the door of the door assembly.

To describe the operation of the door assembly 54, let it be assumed that the track 18 is in the retracted position of FIG. 1. For purposes of illustration, the track 18 is also shown in FIG. 6 in broken lines in its retracted position, and it can be seen that in the retracted position, the track 18 essentially occupies the upper forward opening portion 42a. Further, for convenience of illustration, the track 18 is not shown in FIGS. 3, 4 and 5. It can be seen that there is a moderate clearance between the track 18 and the surrounding portions of the opening portion 42a, but this is of little consequence since the opening portion 42 is substantially aerodynamically concealed by the slat 14.

When the track 18 is in its retracted position, the upper edge 86 of the track 18 engages the lower edge 88 of the door member 56 so as to hold the door member 56 in the retracted position 56a. However, as the track begins to move forwardly and downwardly toward its deployed positions 18a or 18b, the track upper edge 86 drops downwardly relative to the upper edge 46 defining the opening 42. At the same time, the spring member 74 urges the door member 56 downwardly so that the door member 56 moves into its deployed position 56b where it closes the forward opening portion 42a. With the door member 56 so positioned, it blends aerodynamically with the front skin section 38 so as to form with the skin section 38 a substantially uninterrupted aerodynamic surface.

When the slat 14 is retracted, the upper edge 86 of the track 18 again comes into contact with the lower edge 88 of the door member 56 so as to move the door member 56 upwardly, laterally and rearwardly, about the axis of rotation 82 to the retracted position 56a.

An examination of the geometric parameters of the door assembly 54 will reveal that the arrangement of this door assembly 54 rather cleverly moves the door member 56 from its deployed to its retracted position in a manner to compensate quite effectively for the space limitations imposed by the location of the web 52. It can be seen in FIG. 3 that the door member 56 in its retracted position 56a has moved in an upward, rearward and lateral arcuate path (i.e. lateral indicating a direction parallel to a spanwise direction of the wing) so that the door member 56 moves totally out of the space occupied by the track 18 in its deployed position, but in a manner that the door member 56 has a relatively small increment of rearward movement (i.e. movement in a chordwise direction relative to the wing 10). To accomplish the operating features of the present invention, the axis of rotation 82 should have a substantial component of alignment generally perpendicular to the plane occupied by the upper skin portion 84, this being the skin portion which the door member 56 moves adjacent to as it moves to its deployed position 56a. Further, as indicated previously, the axis of rotation 82 should have a substantial components of alignment which lie in a vertical plane which is generally parallel to a vertical plane in which the main track 18 moves in travelling between its retracted position to its deployed positions 14a or 14b.

Obviously, the axis of rotation 82 could deviate to some extent from these alignment limitations, depending upon the geometry and configuration of the surrounding structure. Further, while the present invention has been shown used with a track 18, it is to be understood that it could be used with other components where similar problems exist, such as a service connection (e.g. a telescoping tube) which would provide de-icing for the leading edge slat. Further, while this invention has been described as being used in conjunction with a slat, it could also be used with other such devices, and the term "leading edge" is, within the broader scope of the present invention, intended to refer to a trailing edge configuration where like problems may exist. Other modifications could be made without departing from the spirit and scope of the present invention.

I claim:

1. In an airfoil where there is a leading edge structure having a front skin section and a leading edge device having a cruise position covering said front skin section, and a deployed position where said front skin section is exposed to airflow, said airfoil having a spanwise axis, a chordwise axis and a vertical axis, said airfoil having a connecting member extending between said leading edge structure and said leading edge device, said front skin section having a front opening through which said connecting member extends, said airfoil being characterized in that during movement of said leading edge device to its deployed position, said connecting member has a component of motion in said opening generally transverse to said chordwise axis to a transversely displaced position, so as to leave a portion of said opening as an exposed front skin open area, an improvement to close said exposed front skin open area when the connecting member is in its transversely displaced position, said improvement comprising:
  a. a door having a surface configuration generally matching said exposed front skin open area;
  b. a pivot mounting device by which said door is pivotally mounted in said leading edge structure for movement about an axis of rotation having a substantial alignment component generally perpendicular to a portion of said front skin section adjacent to said exposed front skin open area, and substantial alignment components parallel to a plane of movement through which said connecting member moves from its first position to its second position, said mounting device being characterized in that said door has a first retracted position where said door is removed from said exposed front surface open area and displaced about said axis of rotation from a position occupied by said connecting member in its retracted position, and a second deployed position where said door is positioned in said plane of movement and closes at least a portion of said exposed front surface open area;
  c. means to cause said door to move between its retracted and deployed positions.

2. The improvement as recited in claim 1, wherein said means to cause said door to move comprises spring means operatively connected to said door to move the door toward its deployed position.

3. The improvement as recited in claim 2, wherein said door has a contact portion, and said connecting member in moving from its deployed to its retracted position engages said contact portion to move said door to its retracted position.

4. The improvement as recited in claim 1, wherein said door has a contact portion, and said connecting member in moving from its deployed to its retracted position engages said contact portion to move said door to its retracted position.

5. The improvement as recited in claim 1, wherein said connecting member is characterized in that in moving between its retracted to its deployed position, said connecting member moves forwardly and also downwardly, so as to leave the exposed front surface open area above said connecting member in its deployed position.

6. The improvement as recited in claim 5, wherein said front skin section has at the location of said opening an upward and rearward slant, and said axis of rotation is oriented so that said door moves in an upward and rearward direction adjacent said front skin section adjacent said opening.

7. The improvement as recited in claim 1, wherein:
  a. said means to cause said door to move comprises spring means operatively connected to said door to move the door toward its deployed position;
  b. said door has a contact portion, and said connecting member in moving from its deployed to its retracted position engages said contact portion to move said door to its retracted position;
  c. said connecting member is characterized in that in moving between its retracted to its deployed position, said connecting member moves forwardly and also downwardly, so as to leave the exposed front surface open area above said connecting member in its deployed position;
  d. said front skin section has at the location of said opening an upward and rearward slant, and said axis of rotation is oriented so that said door moves in an upward and rearward direction adjacent said front skin section adjacent said opening.

8. In an airfoil where there is a leading edge structure having a front skin section and a leading edge device having a cruise position covering said front skin section, and a deployed position where said front skin section is exposed to airflow, said airfoil having a spanwise axis, a chordwise axis and a vertical axis, said airfoil having a connecting member extending between said leading edge structure and said leading edge device, said front skin section having a front opening through which said connecting member extends, said airfoil being characterized in that during movement of said leading edge device to its deployed position, said connecting member has a component of motion in said opening generally transverse to said chordwise axis to a transversely displaced position, so as to leave a portion of said opening as an exposed front skin open area, a method to close said exposed front skin open area when the connecting member is in its transversely displaced position, said method comprising:
  a. providing a door having a surface configuration generally matching said exposed front skin open area;
  b. moving said door about a pivot mounting in said leading edge structure for movement about an axis of rotation having a substantial alignment component generally perpendicular to a portion of said front skin section adjacent to said exposed front skin open area, and substantial alignment components parallel to a plane of movement through which said connecting member moves from its first position to its second position, said method being further characterized by moving said door between a first retracted position where said door is removed from said exposed front surface open area and displaced about said axis of rotation from a position occupied by said connecting member in its retracted position, and a second deployed position where said door is positioned in said plane of movement and closes at least a portion of said exposed front surface open area.

9. The method as recited in claim 8, wherein said door is moved by spring means operatively connected to said door to move the door toward its deployed position.

10. The method as recited in claim 9, wherein said door has a contact portion, said method further comprising moving said connecting member from its deployed to its retracted position in a manner to engage said contact portion to move said door to its retracted position.

11. The method as recited in claim 8, wherein said door has a contact portion, said method further comprising moving said connecting member from its deployed to its retracted position in a manner to engage said contact portion to move said door to its retracted position.

12. The method as recited in claim 8, wherein in moving between its retracted to its deployed position, said connecting member moves forwardly and also downwardly, so as to leave the exposed front surface open area above said connecting member in its deployed position.

13. The method as recited in claim 12, wherein said front skin section has at the location of said opening an upward and rearward slant, and said method further comprising moving said door member about said axis of rotation which is oriented so that said door moves in an upward and rearward direction adjacent said front skin section adjacent said opening.

14. In an airfoil where there is a leading edge structure having a front skin section having a first forward skin portion and a second upwardly and rearwardly sloping skin portion, and a leading edge device having a cruise position covering said front skin section, and a deployed position where said front skin section is exposed to airflow, said airfoil having a spanwise axis, a chordwise axis and a vertical axis, said airfoil having a connecting member extending between said leading edge structure and said leading edge device, said front skin section having a front opening through which said connecting member extends, said airfoil being characterized in that during movement of said leading edge device to its deployed position, said connecting member has a downward component of motion in said opening to be in a downwardly displaced position, so as to leave an upper portion of said opening as an exposed front skin open area, an improvement to close said exposed front skin open area when the connecting member is in its transversely displaced position, said improvement comprising:
  a. a door having a surface configuration generally matching said exposed front skin open area and adapted to close at least a portion of said exposed front skin open area;
  b. a pivot mounting device by which said door is pivotally mounted in said leading edge structure for movement about an axis of rotation having a substantial alignment component generally perpendicular to said second skin portion of said front skin section adjacent to said exposed front skin open area, and substantial alignment components parallel to a vertical plane of movement through which said connecting member moves from its first position to its second position, said mounting device being characterized in that said door has a first retracted position where said door is removed from said exposed front surface open area and displaced about said axis of rotation from a position occupied by said connecting member in its retracted position, and a second deployed position where said door is positioned in said plane of movement and closes at least a portion of said exposed front surface open area, said axis of rotation being oriented so that said door moves in an upward, rearward and lateral direction adjacent said second skin portion;
  c. spring means operatively connected to said door to cause said door to move from its retracted position to its deployed position;
  d. said door having a contact portion, and said connecting member being characterized in that in moving from its deployed to its retracted position engages said contact portion to move said door to its retracted position.

15. The improvement as recited in claim 14, wherein said leading edge device comprises a leading edge slat which moves downwardly and forwardly so as to form with the front surface section a slot through which air flows in an upward direction and thence over an upper surface of said airfoil.

16. The improvement as recited in claim 15, wherein said connecting member comprises a track member which moves in a downward and forward direction to locate said slat in its deployed position.

17. The improvement as recited in claim 14, wherein said spring means comprises a first mounting arm connected to said leading edge structure and a second mounting arm pivotally connected to the first mounting arm and connected to said door, said spring means further comprising a spring member operatively connected between said first and second arms to urge said door to its deployed position.

18. The improvement as recited in claim 17, wherein said axis of rotation is located adjacent said door at a location which is adjacent a lower side portion of said door in a manner that said door in moving from its deployed position has primarily an upward movement when said door moves initially from its deployed position.

* * * * *